United States Patent
Hodges et al.

(10) Patent No.: US 7,519,657 B2
(45) Date of Patent: Apr. 14, 2009

(54) METHODS FOR PROVIDING COMMUNICATIONS SERVICES

(75) Inventors: Donna K. Hodges, Cumming, GA (US); Barrett Morris Kreiner, Norcross, GA (US); Steven N. Tischer, Atlanta, GA (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 744 days.

(21) Appl. No.: 10/720,586

(22) Filed: Nov. 24, 2003

(65) Prior Publication Data

US 2005/0111444 A1    May 26, 2005

(51) Int. Cl.
*G06F 15/177* (2006.01)
*G06F 15/16* (2006.01)
*G06F 13/00* (2006.01)

(52) U.S. Cl. .................. 709/203; 709/220; 709/222; 709/230; 725/38; 725/91; 725/111

(58) Field of Classification Search .................. 370/204; 725/38; 709/203
See application file for complete search history.

(56) References Cited

U.S. PATENT DOCUMENTS

| | | | |
|---|---|---|---|
| 5,752,186 A | | 5/1998 | Malackowski et al. |
| 5,790,176 A | * | 8/1998 | Craig .................. 725/115 |
| 5,862,471 A | | 1/1999 | Tiedemann et al. |
| 5,970,121 A | | 10/1999 | Homayoun |
| 5,978,780 A | | 11/1999 | Watson |
| 6,002,689 A | | 12/1999 | Christie |
| 6,016,307 A | | 1/2000 | Kaplan |
| 6,058,301 A | | 5/2000 | Daniels |
| 6,104,718 A | | 8/2000 | Christie |
| 6,178,170 B1 | | 1/2001 | Duree |
| 6,285,871 B1 | | 9/2001 | Daniels |
| 6,385,198 B1 | | 5/2002 | Ofek |
| 6,421,714 B1 | | 7/2002 | Rai et al. |
| 6,456,594 B1 | | 9/2002 | Kaplan |
| 6,516,194 B2 | | 2/2003 | Hanson |
| 6,519,693 B1 | | 2/2003 | Debey |
| 6,522,883 B2 | | 2/2003 | Titmuss |

(Continued)

OTHER PUBLICATIONS

Greene, William, "Sample selection in credit-scoring models", Mar. 31, 1998, Dept. of Econ, Stern School of Business, NYU, Elsevier Science, Japan and the World Economy, pp. 299-316.

*Primary Examiner*—Tonia L Dollinger
*Assistant Examiner*—Anish Sikri
(74) *Attorney, Agent, or Firm*—Scott P. Zimmerman, PLLC

(57) ABSTRACT

Methods, systems, and products are disclosed for providing communications services. One method receives a first data stream at a computer, and the first data stream includes packets of data packetized according to a packet protocol. The first data stream is segmented into segments according to a set of subscriber-specified rules stored in memory. A subscriber to a subscription service specifies the set of subscriber-specified rules, and the set of subscriber-specified rules specifies how electronic data is formatted for the subscriber. At least one segment is dispersed via a network for a subsequent processing service. A result of the processing service is received. A second data stream is assembled, and the second data stream includes at least one of i) the result of the processing service and ii) another segment. The second data stream is then communicated via the network.

20 Claims, 6 Drawing Sheets

U.S. PATENT DOCUMENTS

| | | |
|---|---|---|
| 6,535,592 B1 | 3/2003 | Snelgrove |
| 6,567,375 B2 * | 5/2003 | Balachandran et al. ...... 370/204 |
| 6,738,815 B1 | 5/2004 | Willis et al. |
| 6,836,465 B2 | 12/2004 | Rajan et al. |
| 6,917,628 B2 | 7/2005 | McKinnin et al. |
| 6,934,530 B2 | 8/2005 | Engelhart |
| 6,950,847 B2 | 9/2005 | Harrisville-Wolff et al. |
| 6,957,226 B2 | 10/2005 | Attias |
| 6,978,308 B2 | 12/2005 | Boden et al. |
| 7,043,225 B1 | 5/2006 | Patel et al. |
| 7,155,517 B1 | 12/2006 | Koponen |
| 7,184,548 B2 * | 2/2007 | Wee et al. ...................... 380/37 |
| 7,289,489 B1 | 10/2007 | Kung et al. |
| 2001/0029544 A1 | 10/2001 | Cousins |
| 2002/0073182 A1 | 6/2002 | Zakurdauv et al. |
| 2002/0087674 A1 | 7/2002 | Guilford |
| 2002/0112060 A1 * | 8/2002 | Kato ........................ 709/227 |
| 2002/0138418 A1 | 9/2002 | Zarin et al. |
| 2002/0146102 A1 | 10/2002 | Lang |
| 2002/0164018 A1 | 11/2002 | Wee |
| 2002/0176378 A1 | 11/2002 | Hamilton |
| 2003/0012376 A1 | 1/2003 | Wee |
| 2003/0043815 A1 | 3/2003 | Tinsley |
| 2003/0051054 A1 | 3/2003 | Redllich et al. |
| 2003/0055723 A1 | 3/2003 | English |
| 2003/0088778 A1 | 5/2003 | Lindqvist |
| 2003/0093550 A1 | 5/2003 | Lebizay |
| 2003/0093790 A1 * | 5/2003 | Logan et al. .................. 725/38 |
| 2003/0126610 A1 * | 7/2003 | Ando .......................... 725/91 |
| 2003/0143978 A1 | 7/2003 | Cooper et al. |
| 2003/0211856 A1 | 11/2003 | Zilliacus |
| 2003/0233332 A1 | 12/2003 | Keeler et al. |
| 2004/0019900 A1 * | 1/2004 | Knightbridge et al. ........ 725/23 |
| 2004/0132449 A1 | 7/2004 | Kowarsch |
| 2004/0139208 A1 * | 7/2004 | Tuli .......................... 709/230 |
| 2004/0160932 A1 | 8/2004 | Yegoshin |
| 2004/0221053 A1 | 11/2004 | Codella et al. |
| 2004/0249927 A1 | 12/2004 | Pezutti |
| 2004/0267686 A1 | 12/2004 | Chayes |
| 2005/0038637 A1 | 2/2005 | Balakrishnan et al. |
| 2005/0060420 A1 | 3/2005 | Kovacevic |
| 2005/0094725 A1 | 5/2005 | Hui |
| 2006/0031515 A1 | 2/2006 | VanGassel et al. |
| 2006/0041679 A1 | 2/2006 | Feig |
| 2006/0206619 A1 | 9/2006 | Dan et al. |
| 2007/0203844 A1 | 8/2007 | Kuhn et al. |
| 2007/0299771 A1 | 12/2007 | Brody et al. |

* cited by examiner

METHODS FOR PROVIDING COMMUNICATIONS SERVICES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATIONS

This application relates to the copending and the commonly assigned U.S. application Ser. No. 10/720,941, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,800, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,956, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,946, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,587, entitled "Methods for Providing Communications Services", filed concurrently herewith, and of which the "Brief Summary of the Invention" section and the "Detailed Description of the Invention", section are incorporated herein by reference.

This application relates to the copending and the commonly assigned U.S. application Ser. No. 10/720,892, entitled "Methods for Providing Communications Services", filed concurrently herewith, and of which the "Brief Summary of the Invention" section and the "Detailed Description of the Invention" section are incorporated herein by reference.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis module. This Analysis module comprises methods, computer systems, computer programs, and computer program products that provide communications services to subscribers. The Analysis module of this invention provides communications services according to a set of subscriber-specified rules. The set of subscriber-specified rules is specified by a subscriber to a subscription service, and the set of subscriber-specified rules specifies how electronic data is formatted for the subscriber. That is, the set of subscriber-specified rules allows the subscriber to determine how downloaded electronic data, such as movies and other audio-video data, is formatted to suit the subscriber's needs. The subscriber, for example, may specify that the electronic data be scaled or color corrected to suit a display device of a client communications device. The subscriber may also specify that any electronic data be encrypted for privacy/security concerns. The subscriber could even use the set of subscriber-specified rules to specify how the electronic data is segmented, dispersed, assembled, and communicated. The set of subscriber-specified rules might even have a calendar component, and this calendar component allows the subscriber to specify rules based upon the time of day and/or the day of week. The set of subscriber-specified rules allows the Analysis module to assemble and to communicate a new, formatted data stream. This formatted data stream may then be viewed/ executed/presented on a client communications device with little or no regard for the original format of the electronic data. That is, the assembled results have already been substantially formatted, transformed, processed, and/or manipulated to suit the processing, storage, and/or audio/display requirements of the client communications device.

This invention discloses methods, systems, and products for providing communications services. One of the embodiments describes a method for providing communications services. This method receives a first data stream at a computer, and the first data stream includes packets of data packetized according to a packet protocol. The first data stream is segmented into segments according to a set of subscriber-specified rules stored in memory. A subscriber to a subscription service specifies the set of subscriber-specified rules, and the set of subscriber-specified rules specifies how electronic data is segmented, dispersed, and assembled for the subscriber. At least one segment is dispersed via a network for a subsequent processing service. A result of the processing service is received. A second data stream is assembled, and the second data stream includes at least one of i) the result of the processing service and ii) another segment. The second data stream is then communicated via the network.

Other embodiments of this invention describe a system for providing communications services. The system includes a Analysis module stored in a memory device, and a processor communicates with the memory device. The Analysis module receives a first data stream at a computer, and the first data stream comprises packets of data packetized according to a packet protocol. The Analysis module segments the first data stream into segments according to a set of subscriber-specified rules stored in memory. A subscriber to a subscription service specifies the set of subscriber-specified rules, and the set of subscriber-specified rules specifies how electronic data is formatted for the subscriber. The Analysis module disperses at least one segment via a network for a subsequent processing service, and the Analysis module receives a result of the processing service. The Analysis module assembles a second data stream, and the second data stream includes at least one of i) the result of the processing service and ii) another segment. The Analysis module then communicates the second data stream via the network.

Other embodiments of this invention describe a computer program product. A computer-readable medium stores a Analysis module. The Analysis module receives a first data stream at a computer, and the first data stream includes packets of data packetized according to a packet protocol. The Analysis module segments the first data stream into segments according to a set of subscriber-specified rules stored in memory. A subscriber to a subscription service specifies the set of subscriber-specified rules, and the set of subscriber-specified rules determines how electronic data is formatted for the subscriber. The Analysis module disperses at least one segment via a network for a subsequent processing service, and the Analysis module receives a result of the processing service. The Analysis module then assembles a second data stream comprising at least one of i) the result of the processing service and ii) another segment, and the Analysis module communicates the second data stream via the network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
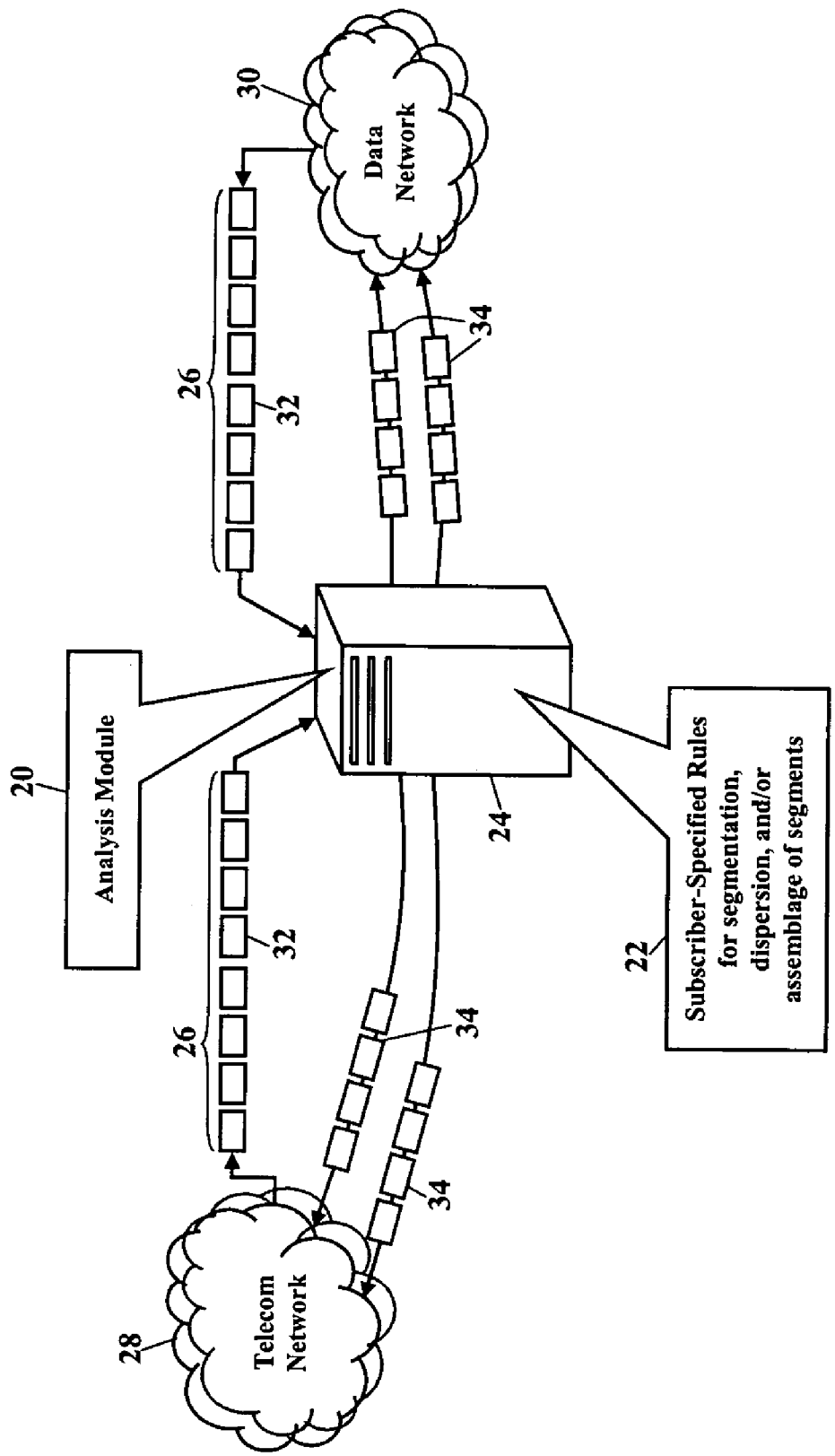
FIGS. 1 and 2 are schematics illustrating one or more embodiments of this invention.
Figure 2:
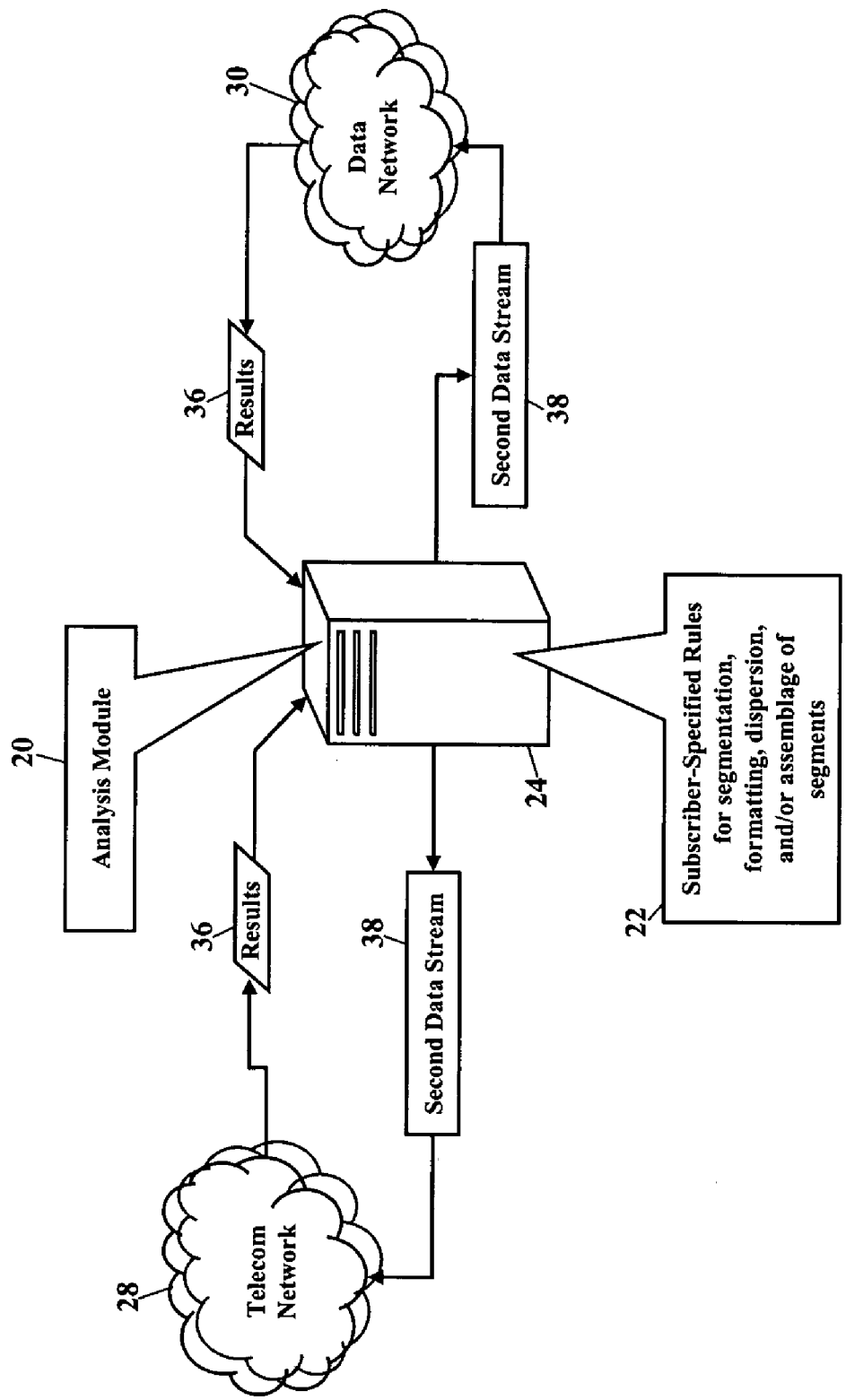

FIGS. 1 and 2 are schematics illustrating one of the embodiments of this invention. FIG. 1 shows a Analysis module 20 accessing a set 22 of subscriber-specified rules. The Analysis module 20 comprises methods, systems, computer programs, and/or computer program products that help provide communications services. The Analysis module 20 operates within a computer 24, and the computer 24 receives a first stream 26 of data via a communications network 28 and/or via a data network 30. The first stream 12 of data typically includes individual packets 32 of information. The Analysis module 20 acts upon the first stream 26 of data by segmenting the individual packets 32 into segments 34 according to the set 22 of subscriber-specified rules. The set 22 of subscriber-specified rules is specified by a subscriber to a subscription service, and the set 22 of subscriber-specified rules specifies how electronic data is formatted for the subscriber. That is, the set 22 of subscriber-specified rules allows the subscriber to determine how electronic data, such as the first stream 26 of data, is formatted to suit the subscriber's needs. The subscriber, for example, may specify that the first stream 26 of data be scaled or color corrected to suit a display device of a client communications device (not shown for simplicity). The subscriber may specify that any electronic data be encrypted for privacy/security concerns. The subscriber could even use the set 22 of subscriber-specified rules to specify how the first stream 26 of data is segmented. Once a segment 34 is created, if the segment 34 requires subsequent processing, the Analysis module 20 then disperses that segment 34 for a subsequent processing service. The Analysis module 20 routes the segment 34 to other devices and/or locations via the communications network 28 and/or via the data network 30, and the subsequent processing service is performed.

As FIG. 2 shows, the Analysis module 20 receives the results 36 of the subsequent processing services. When the subsequent processing service is complete, the Analysis module 20 aggregates the result(s) 36 of the subsequent processing service(s). The Analysis module 20 may also access the set 22 of subscriber-specified rules to determine how the subscriber wants the results 36 assembled, formatted, and/or communicated. The Analysis module 20 then assembles those results 36, and any unprocessed segments 34, into a second data stream 38. As FIG. 2 shows, the second data stream 38 is typically communicated via the communications network 28 and/or the data network 30 to another destination. That is, the second data stream 38 may be communicated to another computer device, and/or the second data stream 38 may be communicated to a client communications device (not shown for simplicity). The client communications device may then view/execute/present the second data stream 38. Because the Analysis module 20 consulted the set 22 of subscriber-specified rules, the second data stream 38 has been substantially formatted, assembled, and communicated to the requirements/desires of the subscriber. That is, the second data stream 38 has been segmented, dispersed, formatted, transformed, encrypted, scaled, compressed, manipulated, assembled, and/or communicated to suit the subscriber's needs, as specified in the set 22 of subscriber-specified rules.

Figure 3:
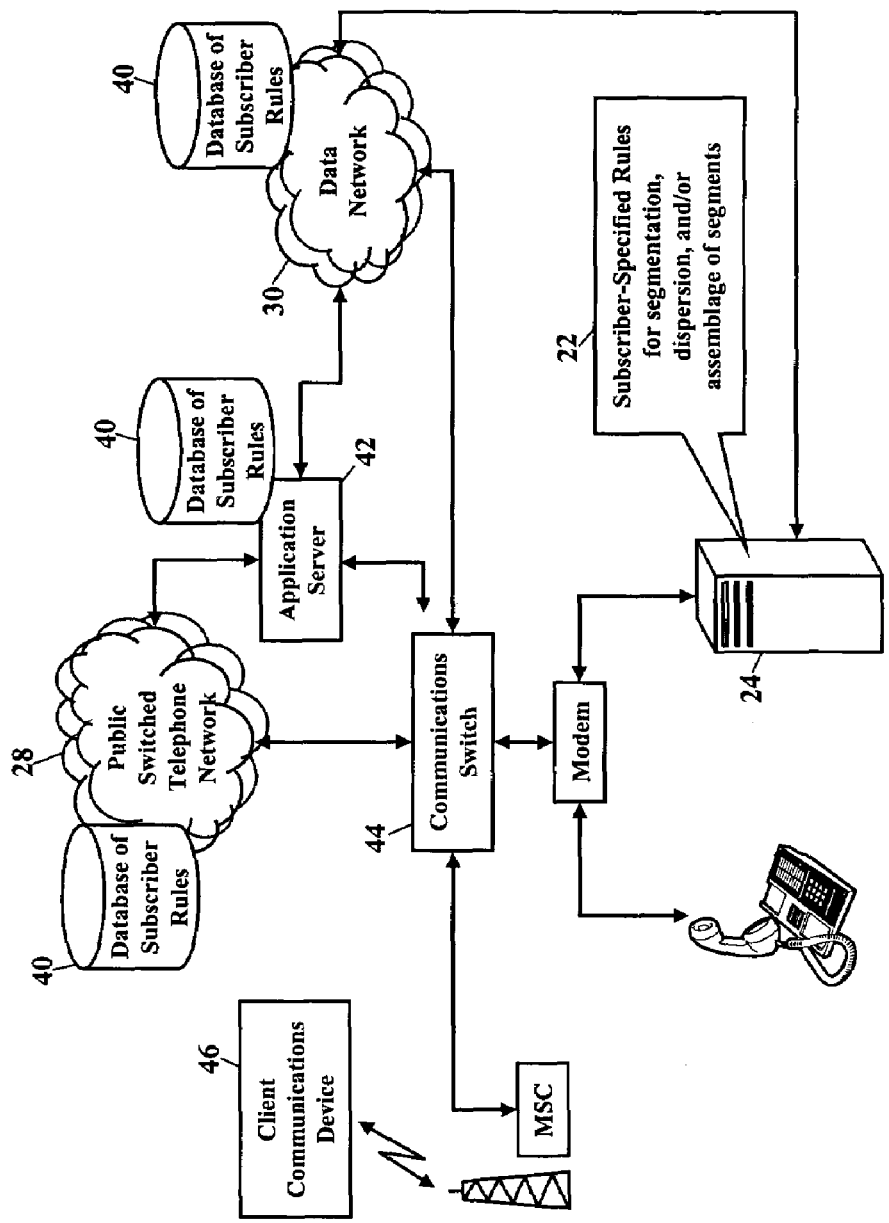
FIG. 3 is a schematic illustrating a set of subscriber-specified rules according to another of the embodiments of this invention.

FIG. 3 is a schematic illustrating another of the embodiments of this invention. FIG. 3 shows the set 22 of subscriber-specified rules is stored/maintained in a database 40 of subscriber rules. The database 40 of subscriber rules stores multiple sets of subscriber-specified rules for multiple subscribers; each set of subscriber-specified rules corresponds to at least one subscriber. The database 40 of subscriber rules may be stored/maintained on any computer device (not shown) communicating with the communications network 28 and/or with the data network 30. FIG. 3 shows that the database 40 of subscriber rules may also be stored/maintained, or accessible to, an application server 42 communicating with a communications switch 44. FIG. 3 also shows the set 22 of subscriber-specified rules locally stored on the computer 24 and/or locally stored on a client communications device 46. Wherever the set 22 of subscriber-specified rules is stored, and/or wherever the database 40 of subscriber rules is stored, each is stored within memory.

The Analysis module 20 consults the set 22 of subscriber-specified rules. The set 22 of subscriber-specified rules specifies how the subscriber wants electronic data formatted. When the subscriber requests electronic data, that requested electronic data is then formatted according to the set 22 of subscriber-specified rules. The term "formatted" encompasses any segmentation, dispersed, and assemblage of electronic data. That is, the term "formatted" means the electronic data that is transformed, encrypted, scaled, compressed, manipulated, assembled, and/or communicated to suit the subscriber's needs, as specified in the set 22 of subscriber-specified rules. The set 22 of subscriber-specified rules stores various factors, rules, requirements, and/or objectives that determine how the subscriber desires to have electronic data formatted. The set 22 of subscriber-specified rules, for example, might specify that the subscriber desires any audio-video data to have an MPEG coding (those of ordinary skill in the art of programming and communications are assumed familiar with the "Moving Picture Experts Group" family of International Standards for coding audio-visual information in a digital compressed format, e.g., MPEG-1, MPEG-2 and MPEG-4). The subscriber might also specify that the Analysis module 20 process/convert any requested non-MPEG data into the MPEG coding. The set 22 of subscriber-specified rules might also specify that any XML segment be discarded that has five percent (5%) or less pixel data change within two seconds; the objective being to reduce local processing times. The set 22 of subscriber-specified rules might specify that 128-bit audio segments be "chopped" to suit the limited, reduced fidelity abilities of a client communications device (such as a mobile phone or a personal data assistant). Video segments, too, might be chopped/compressed/resized to suit the display characteristics of a client communications device. As the Analysis module 20 processes any requested data, the Analysis module 20 abides by the rule, requirement, or objective stored within the set 22 of subscriber-specified rules.

Other examples for the set 22 of subscriber-specified rules can be provided. The set 22 of subscriber-specified rules might have a calendar component. That is, set 22 of subscriber specified rules allows the subscriber to specify rules based upon the time of day and/or the day of week. The subscriber, for example, might specify that any required subsequent processing of a segment be performed during off-peak hours to reduce processing times and/or processing charges. The set 22 of subscriber-specified rules might specify that electronic data only be delivered/communicated outside traditional business hours. That is, the subscriber might want electronic data delivered between 6 PM and 6 AM to avoid network congestion during business hours. The subscriber might also specify that large audio-video files only be delivered after 9 PM on weekdays during the cheaper "nighttime" rates for mobile phone usage. Large audio-video files, however, could be delivered at any time on weekends when many mobile calling plans offer unlimited usage. The subscriber could also specify that all segments be encrypted according to encryption rules stored in the set 22 of subscriber-specified rules, and the encryption rules could also specify how encrypted segments are dispersed, processed, assembled, and communicated.

The set 22 of subscriber-specified rules may also have inference capabilities. That is, the set 22 of subscriber-specified rules can infer an action for unknown/undefined situations. When the Analysis module 20 encounters electronic data, and/or a situation, for which no rule applies, the set 22 of subscriber-specified rules (or the Analysis module 20 itself) could infer a new rule based upon the set 22 of subscriber-specified rules. The set 22 of subscriber-specified rules, as mentioned above, might have a calendar component. The set 22 of subscriber-specified rules, however, could also interface with the subscriber's electronic calendar. When the subscriber has a meeting, telephone call, or other entry in their electronic calendar, the subscriber may not wish to receive electronic data from the Analysis module 20. The set 22 of subscriber-specified rules, therefore, might infer that no electronic data be delivered during scheduled meetings or other entries in the subscriber's calendar.

The set 22 of subscriber-specified rules may also request new rules for new situations. When the Analysis module 20 encounters electronic data, and/or a situation, for which no rule applies, the set 22 of subscriber-specified rules (or the Analysis module 20 itself) could request a new rule. The Analysis module 20 and/or the set 22 of subscriber-specified rules could locate the subscriber and prompt the subscriber for a new rule. The Analysis module 20, for example, could request/initiate a voice telephone call with the subscriber via a gateway and request a new rule. The set 22 of subscriber-specified rules could initiate an electronic query to a client communications device for a new rule. The Analysis module 20 could additionally or alternatively interface with an email server and issue an email to a device associated with the subscriber. The subscriber could then rely to the email and include a new rule to apply. However the new rule is requested, the Analysis module 20 and/or the set 22 of subscriber-specified rules could suspend all processing an await the new rule, only suspend any processing requiring the new rule, and/or discard or ignore the situation for which no rule applies.

Figure 4:
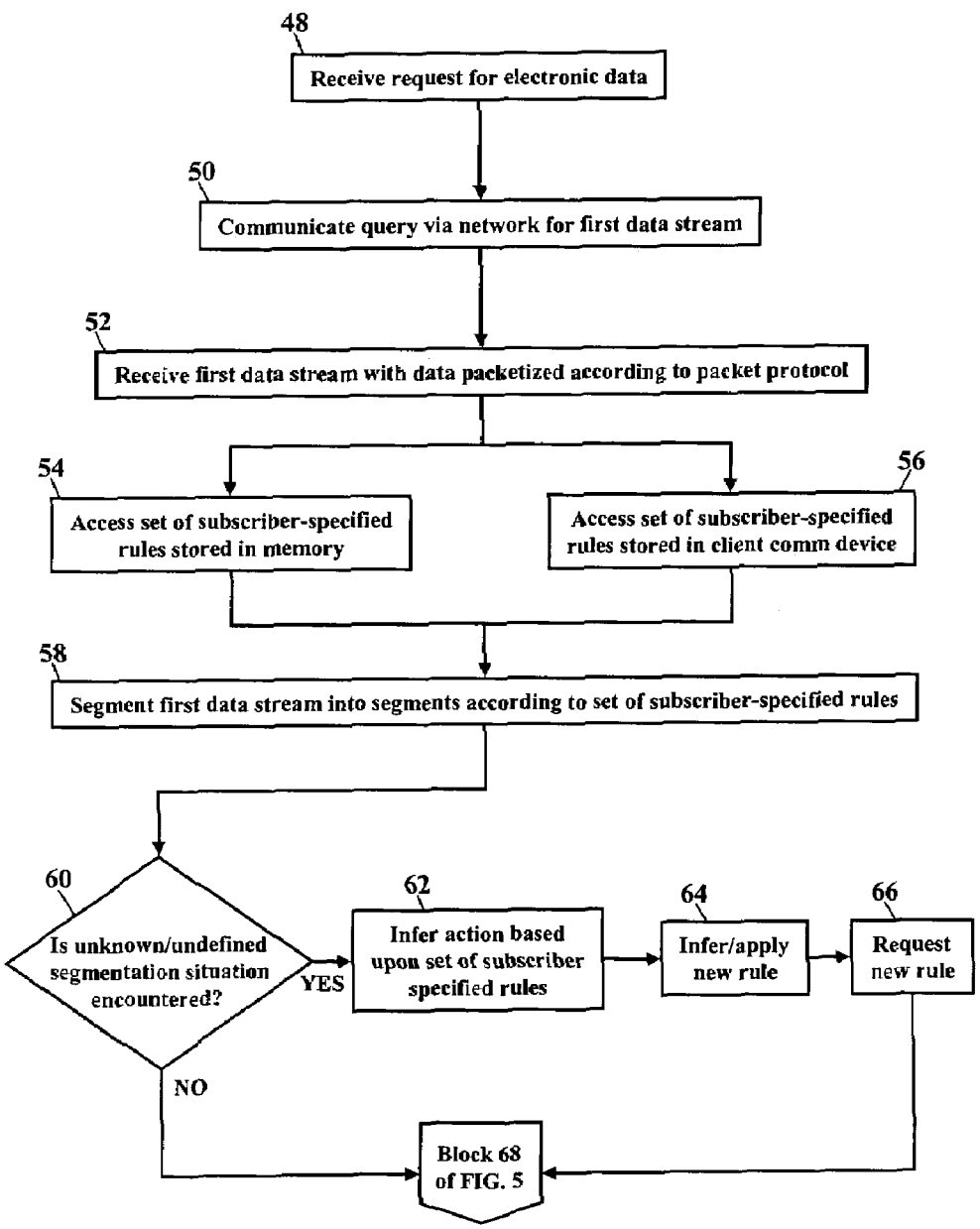
FIGS. 4-6 are flowcharts illustrating a method of providing communications services according to the embodiments of this invention.
Figure 5:
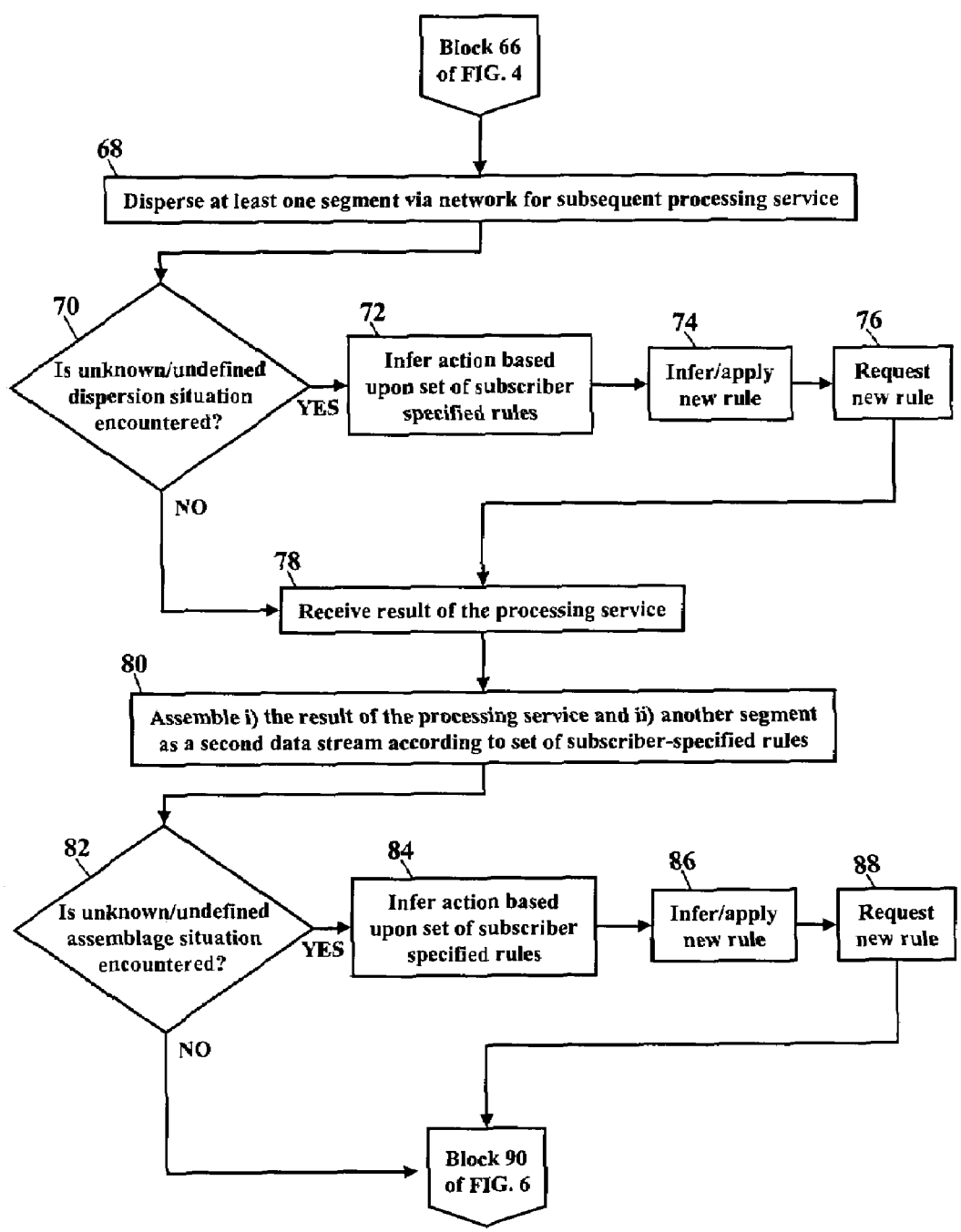
Figure 6:
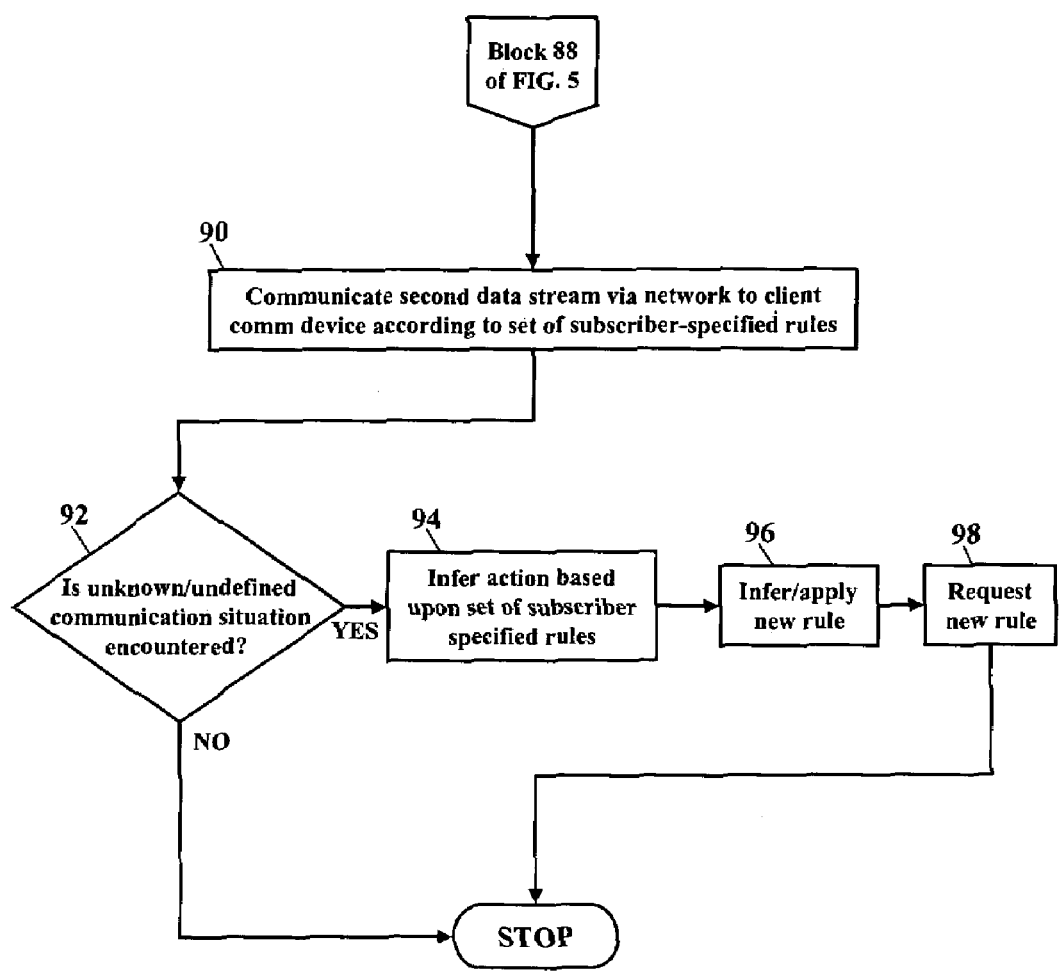

FIGS. 4-6 are flowcharts illustrating a method of providing communications services. A request for electronic data is received (Block 48). The request originates from a client communications device. A query is communicated via a network for a first data stream (Block 50). The first data stream is received at a computer, and the first data stream includes packets of data packetized according to a packet protocol (Block 52). A set of subscriber-specified rules stored in memory is accessed (Block 54). The set of subscriber-specified rules may be stored in the memory of a client communications device (Block 56). A subscriber to a subscription service specifies the set of subscriber-specified rules, and the set of subscriber-specified rules specifies how electronic data is formatted for the subscriber. The first data stream is segmented into segments according to the set of subscriber-specified rules (Block 58). If an unknown/undefined segmentation situation is encountered (Block 60), an action may be inferred based upon the set of subscriber-specified rules (Block 62). A new rule may also be inferred and applied (Block 64). A new rule may also be requested (Block 66).

The flowchart continues with FIG. 5. At least one segment is dispersed via the network for a subsequent processing service, again according to the set of (Block 68). If an unknown/undefined dispersion situation is encountered (Block 70), an action may be inferred (Block 72), a new rule inferred and applied (Block 74), and/or a new rule may be requested (Block 76). A result of the processing service is received (Block 78) and assembled as a second data stream according to the set of subscriber-specified rules (Block 80). The second data stream includes at least one of i) the result of the processing service and ii) another segment. If an unknown/undefined assemblage situation is encountered (Block 82), an action may be inferred (Block 84), a new rule inferred and applied (Block 86), and/or a new rule may be requested (Block 88).

The flowchart continues with FIG. 6. The second data stream is then communicated via the network (Block 90) to a client communications device, according to the set of subscriber-specified rules. If an unknown/undefined communication situation is encountered (Block 92), an action may be inferred (Block 94), a new rule inferred and applied (Block 96), and/or a new rule may be requested (Block 98).

The Analysis module (shown as reference numeral 20 in FIGS. 1-3) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis module to be easily disseminated. A computer program product for providing communications services includes the Analysis module stored on the computer-readable medium. The Analysis module segments a first data stream into segments according to a set of subscriber-specified rules stored in memory. A subscriber to a subscription service specifies the set of subscriber-specified rules, and the set of subscriber-specified rules specifies how electronic data is formatted for the subscriber. The Analysis module disperses at least one segment via a network for a subsequent processing service, and the Analysis module receives a result of the processing service. The Analysis module assembles a second data stream, and the second data stream includes at least one of i) the result of the processing service and ii) another segment. The Analysis module then communicates the second data stream via the network.

The Analysis module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:

retrieving audio-video data comprising packets of data packetized according to a packet protocol;

segmenting the packets according to a set of subscriber-specified rules stored in memory, the set of subscriber-specified rules specified by a subscriber to a subscription service, the set of subscriber-specified rules specifying how the audio-video data is formatted to suit a requirement of a client communications device;

determining a subcontracted processing service is required;

interrogating a different service provider to fulfill the subcontracted processing service;

grouping together individual packets as a segment that require the subcontracted processing service;

subcontracting the segment via a network to the different service provider to receive the subcontracted processing service;

receiving a result of the subcontracted processing service from the different service provider;

assembling formatted audio-visual data comprising the result of the subcontracted processing service and an unprocessed segment; and communicating the formatted audio-visual data via the network.

2. A method according to claim 1, wherein determining the subcontracted processing service is required comprises determining a color correction service is required from the different service provider, and wherein grouping together the individual packets comprises grouping together the individual packets that require the subcontracted color correction service, and wherein receiving the result comprises receiving the result of the subcontracted color correction service.

3. A method according to claim 1, further comprising communicating the formatted audio-visual data to the client communications device.

4. A method according to claim 1, wherein determining the subcontracted processing service is required comprises determining a scaling service is required from the different service provider, and wherein grouping together the individual packets comprises grouping together the individual packets that require the subcontracted scaling service, and wherein receiving the result comprises receiving the result of the subcontracted scaling service.

5. A method according to claim 1, wherein receiving the result comprises receiving an encrypted segment from the different service provider that suits a privacy requirement.

6. A method according to claim 1, wherein dispersing the segment comprises specifying that the different service provider process the segment during off-peak hours.

7. A method according to claim 1, further comprising retrieving the set of subscriber-specified rules from the memory of the client communications device.

8. A method according to claim 1, further comprising inferring an action based upon the set of subscriber-specified rules.

9. A method according to claim 1, further comprising inferring a new rule based upon the set of subscriber-specified rules.

10. A method according to claim 1, further comprising requesting a new rule for a new situation.

11. A system providing communications services, the system comprising:
   means for retrieving audio-video data comprising packets of data packetized according to a packet protocol;
   means for segmenting the packets according to a set of subscriber-specified rules stored in memory, the set of subscriber-specified rules specified by a subscriber to a subscription service, the set of subscriber-specified rules specifying how the audio-video data is formatted to suit a requirement of a client communications device;
   means for discarding an XML data segment having a minimum amount of change in pixel data within a time frame to reduce processing time;
   means for determining a subcontracted processing service is required;
   means for interrogating a different service provider to fulfill the subcontracted processing service;
   means for grouping together individual packets as a segment that require the subcontracted processing service;
   means for subcontracting the segment via a network to the different service provider to receive the subcontracted processing service;
   means for receiving a result of the subcontracted processing service from the different service provider;
   means for assembling formatted audio-visual data comprising the result of the subcontracted processing service and an unprocessed segment; and
   means for communicating the formatted audio-visual data via the network.

12. A computer program product comprising a computer readable medium storing processor-executable instructions for performing a method, the method comprising:
   retrieving audio-video data comprising packets of data packetized according to a packet protocol;
   segmenting the packets according to a set of subscriber-specified rules stored in memory, the set of subscriber-specified rules specified by a subscriber to a subscription service, the set of subscriber-specified rules specifying how the audio-video data is formatted to suit a requirement of a client communications device;
   interfacing with an electronic calendar;
   discarding an XML data segment having a minimum amount of change in pixel data within a time frame to reduce processing time;
   determining a subcontracted processing service is required;
   interrogating a different service provider to fulfill the subcontracted processing service;
   grouping together individual packets as a segment that require the subcontracted processing service;
   subcontracting the segment via a network to the different service provider to receive the subcontracted processing service;
   receiving a result of the subcontracted processing service from the different service provider;
   assembling formatted audio-visual data comprising the result of the subcontracted processing service and an unprocessed segment; and
   declining to communicate the formatted audio-visual data to the client communications device during a scheduled event indicated in the electronic calendar.

13. The system according to claim 11, further comprising:
   means for determining a color correction service is required from the different service provider,
   means for grouping together the individual packets that require the subcontracted color correction service, and
   means for receiving the result of the subcontracted color correction service.

14. The computer program product according to claim 12, further comprising instructions for communicating the formatted audio-visual data to the client communications device.

15. The system according to claim 11, further comprising:
   means for determining a scaling service is required from the different service provider,
   means for grouping together the individual packets that require the subcontracted scaling service, and
   wherein receiving the result comprises receiving the result of the subcontracted scaling service.

16. The system according to claim 11, further comprising means for encrypting the segment to suit a privacy requirement.

17. The system according to claim 11, further comprising means for specifying that the segment be processed during off-peak hours.

18. The computer program product according to claim 12, further comprising instructions for:
   determining a color correction service is required from the different service provider,
   grouping together the individual packets that require the subcontracted color correction service, and
   receiving the result of the subcontracted color correction service.

19. The computer program product according to claim 12, further comprising instructions for:
   determining a scaling service is required from the different service provider,
   grouping together the individual packets that require the subcontracted scaling service, and
   receiving the result of the subcontracted scaling service.

20. The computer program product according to claim 12, further comprising instructions for encrypting the segment to suit a privacy requirement.

* * * * *